United States Patent [19]

Yates et al.

[11] 4,187,135
[45] Feb. 5, 1980

[54] FIBER REINFORCED COMPOSITE SHAFT WITH METALLIC CONNECTOR SLEEVES MOUNTED BY LONGITUDINAL GROOVE INTERLOCK

[75] Inventors: Derek N. Yates, Los Gatos; John C. Presta, San Jose, both of Calif.

[73] Assignee: Celanese Corporation, New York, N.Y.

[21] Appl. No.: 890,231

[22] Filed: Mar. 27, 1978

[51] Int. Cl.² .......................................... B31C 13/00
[52] U.S. Cl. ............................ 156/187; 138/109; 156/188; 156/191; 156/294; 285/115; 285/239; 428/36
[58] Field of Search ............... 156/172, 187, 188, 189, 156/191, 294; 138/109; 285/114, 115, 149, 239, 242; 428/36, 408, 367

[56] References Cited

U.S. PATENT DOCUMENTS

| Re. 26,314 | 11/1967 | Costopoulos | 156/189 |
|---|---|---|---|
| 1,721,253 | 7/1929 | Loughead et al. | 156/294 |
| 2,882,072 | 4/1959 | Noland | 285/149 |
| 3,231,442 | 1/1966 | Michael | 156/155 |
| 3,661,670 | 5/1972 | Pierpont | 156/172 |
| 3,717,180 | 2/1973 | Ambrose et al. | 138/109 |
| 3,788,928 | 1/1974 | Wise | 156/294 |
| 4,041,599 | 8/1977 | Smith | 156/295 |

Primary Examiner—John E. Kittle
Attorney, Agent, or Firm—Kenneth A. Genoni

[57] ABSTRACT

A tubular fiber reinforced composite shaft is formed (as described) which integrally incorporates a metal sleeve or connection at the end thereof. Initially a metal sleeve having circumferentially spaced recesses on the outer periphery thereof is positioned upon a segment of a mandrel. Fibrous material bearing a non-solidified resinous material is applied around the mandrel and around the recesses in the sleeve. Portions of the previously applied fibrous material bearing the non-solidified resinous material are pressed into the recesses. Additional fibrous material bearing the non-solidified resinous material is applied to the previously applied fibrous material. The resinous material next is solidified to form a tubular composite shaft whereby a secure torsion-transmitting connection is made with the sleeve, and the mandrel is removed.

12 Claims, 15 Drawing Figures

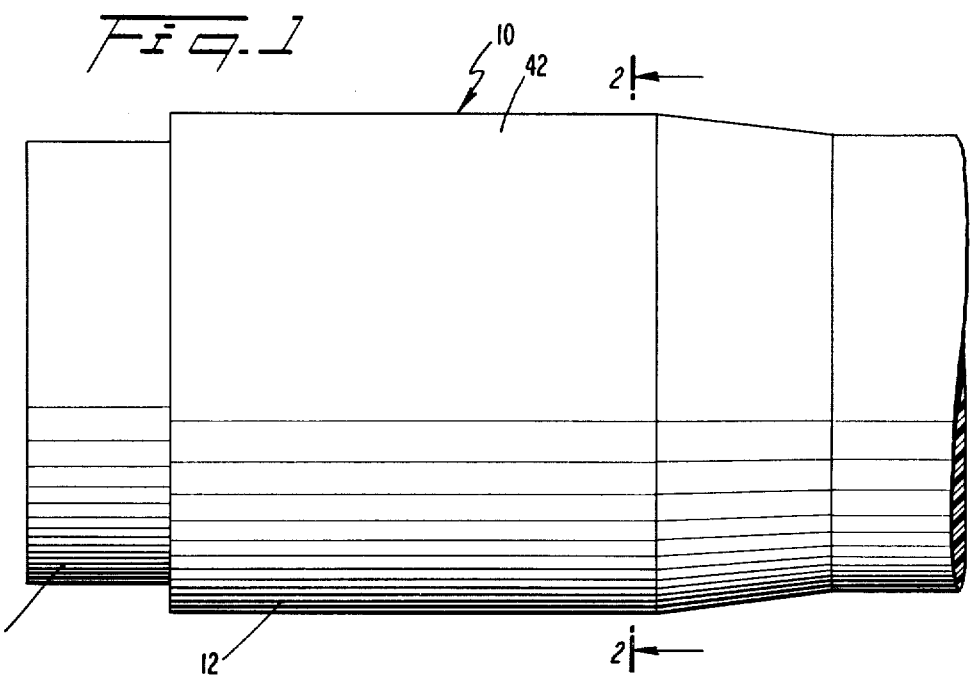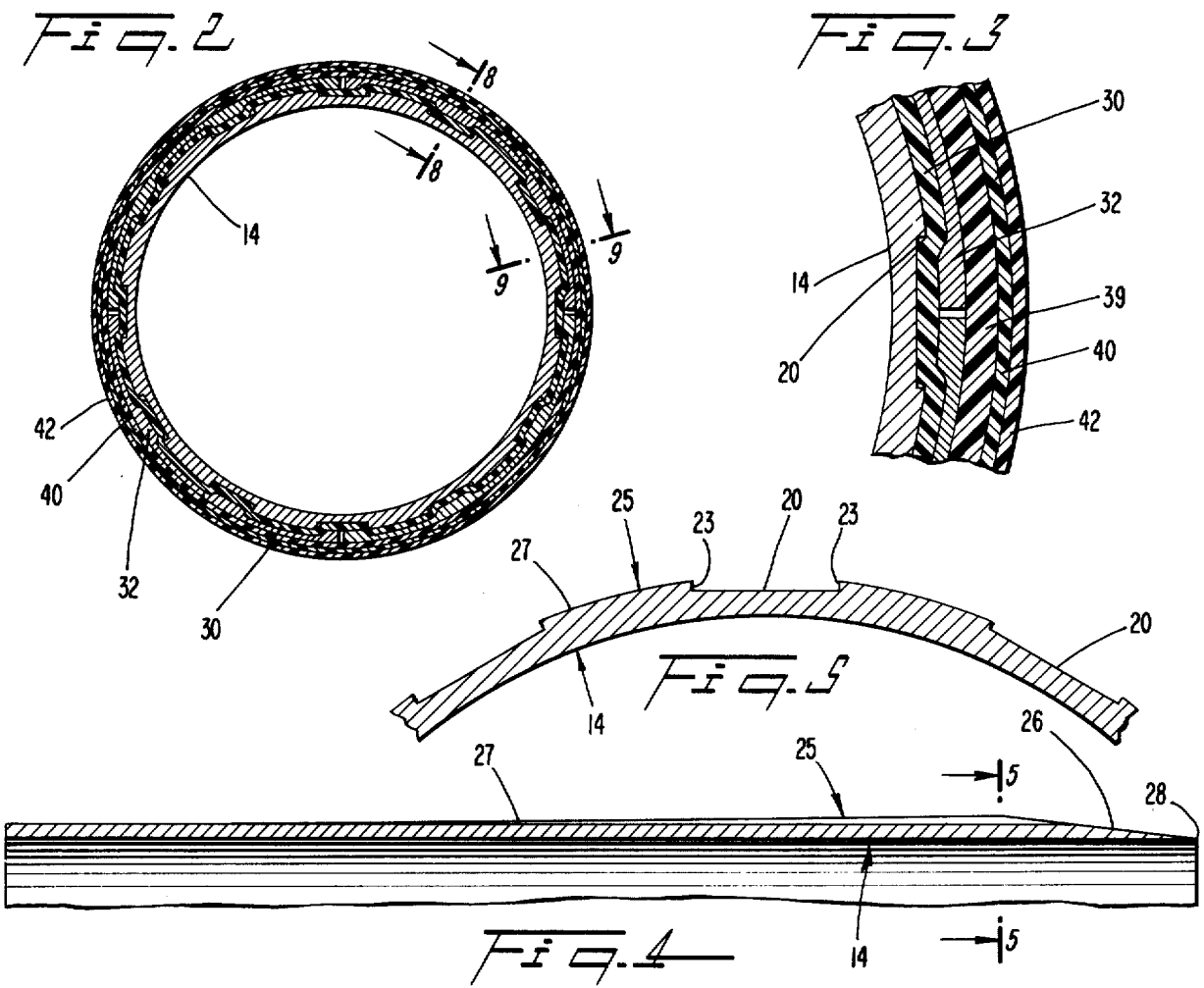

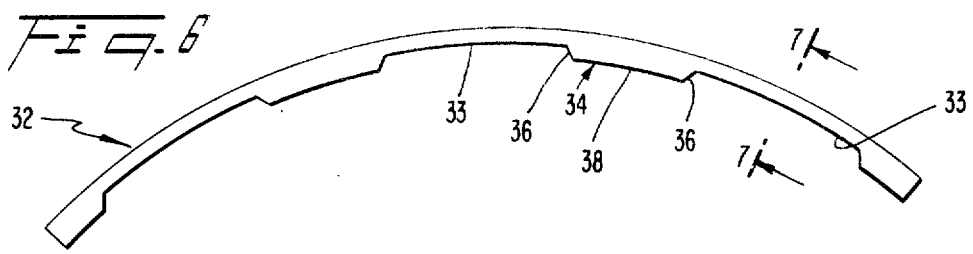
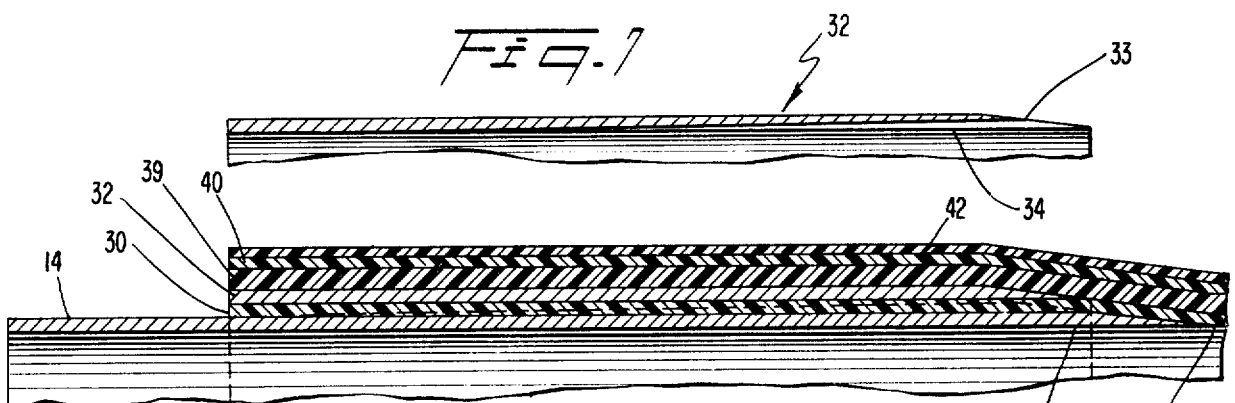
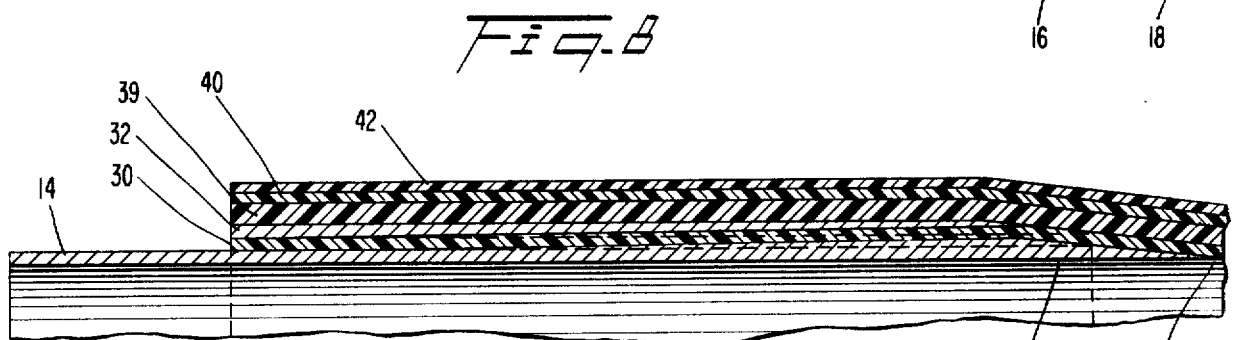
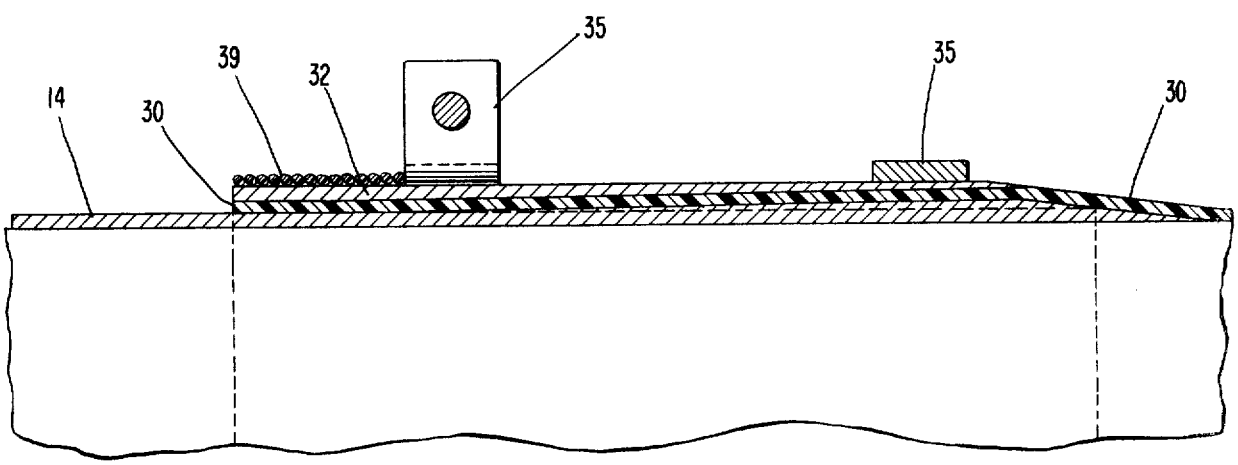

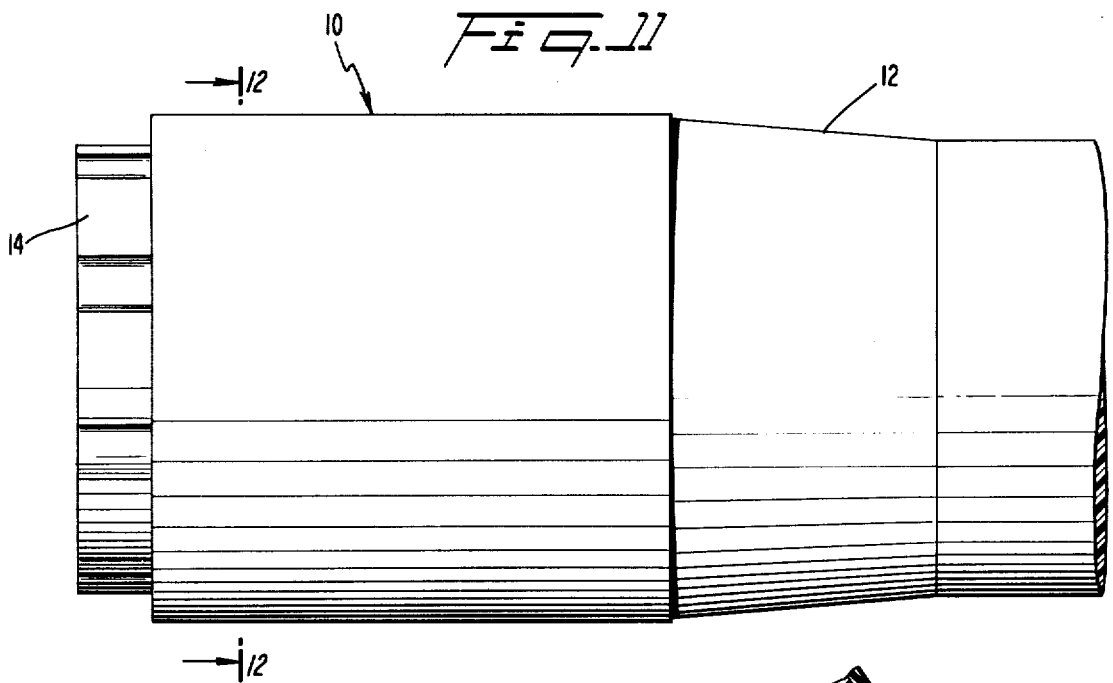
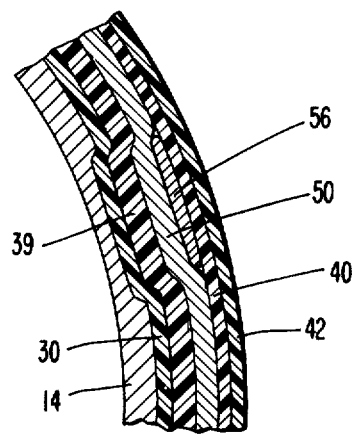
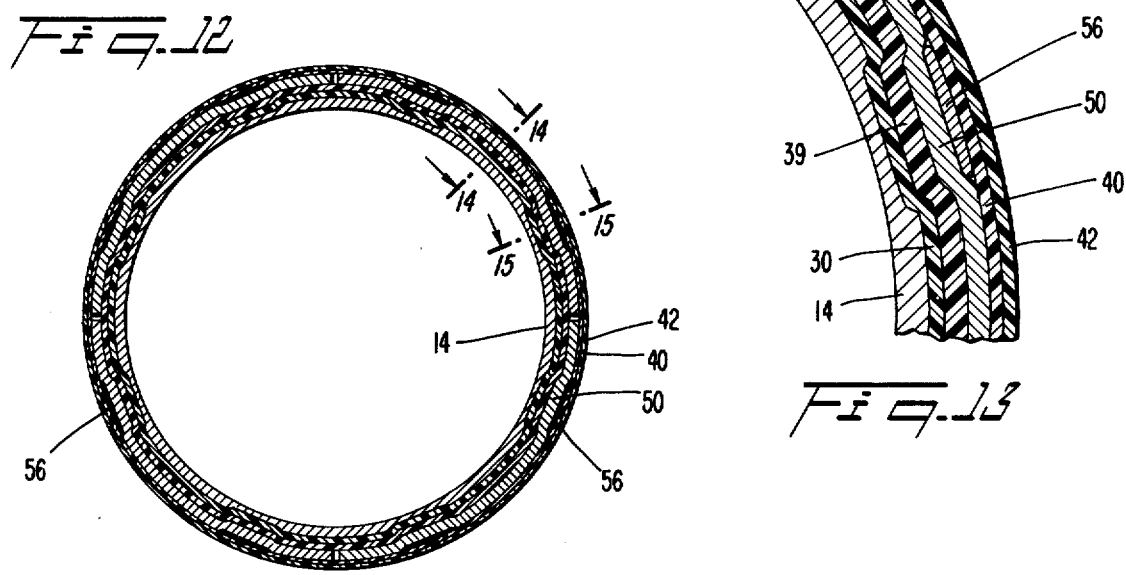
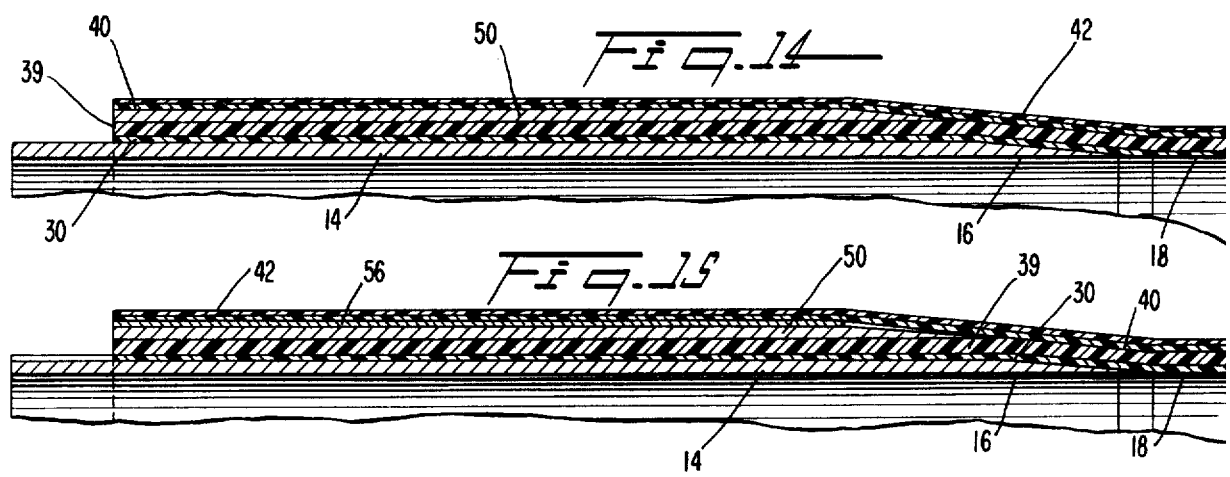

FIBER REINFORCED COMPOSITE SHAFT WITH METALLIC CONNECTOR SLEEVES MOUNTED BY LONGITUDINAL GROOVE INTERLOCK

BACKGROUND AND OBJECTS OF THE INVENTION

This invention relates to fiber reinforced composite shafts and, more especially, to vehicle drive shafts comprising a fiber reinforced resinous shaft body with metallic coupling sleeves mounted at the ends thereof.

Tubular fiber reinforced composites have been heretofore proposed, as demonstrated by U.S. Pat. Nos. 2,882,072 issued to Noland on Apr. 14, 1959, and 3,661,670 issued to Pierpont on May 9, 1972. In the Pierpont patent, for example, it has been proposed to form such composites from a resinous material which is reinforced by glass fibers. In particular, filaments bearing a non-hardened resinous material (i.e., an uncured thermosetting resin) are wound around a mandrel until the desired thickness has been established. The reinforcing fibers can be positioned within the wall of the tubular composite in varying angular relationships. Thereafter, the resinous material is solidified (i.e. is cured). A premolded threaded end portion can be mounted at the ends of the tubular composite, such as by the winding of filaments directly around the end portion during the winding process.

It recently has been proposed to form vehicle drive shafts from tubular fiber reinforced composites, as demonstrated by U.S. Pat. No. 4,041,599 issued to Smith on Aug. 16, 1977, and published Japanese Application No. 52-127542, entitled "Carbon Fiber Drive Shaft" which claims priority for the filing of U.S. Ser. No. 676,856 on Apr. 14, 1976 of Gordon Peter Morgan, now U.S. Pat. No. 4,089,190 issued May 16, 1978. In the Japanese application filaments bearing a non-hardened resinous material (e.g., an uncured thermosetting resin) are wound around a mandrel until the desired thickness has been established, whereupon the resinous material is cured. Zones or layers are positioned circumferentially within the wall of the shaft in the specific angular relationships there disclosed.

The above-mentioned Smith patent proposes the attachment of a carbon fiber reinforced epoxy drive shaft directly to a universal joint extension by a specific bonding technique.

Fiber reinforced composite shafts exhibit advantages over metallic shafts, i.e., they are lighter in weight, more resistant to corrosion, stronger, and more inert.

In copending application Ser. No. 890,230 filed concurrently herewith, of Derek N. Yates and David B. Rezin entitled "Improved Carbon Fiber Reinforced Composite Drive Shaft", a fiber reinforced composite drive shaft is disclosed which exhibits improved service characteristics and the necessary strength and durability to withstand the various stresses encountered during vehicle operation. The disclosure of that copending application is herein incorporated by reference as if set forth at length.

Since direct welding or bonding of a resin shaft to metal does not normally create a sufficiently strong and durable connection on a consistent and reliable basis, the use of metallic connector sleeves mounted at the ends of the shaft in accordance with the concept of the present invention provides a means for accomplishing a secure welded connection similar to that utilized with conventional metallic shafts.

The high torque loads which are to be transmitted by a vehicle drive shaft require that an extremely strong and durable torsional drive connection be established between the sleeves and shaft body. Previous proposals for mounting sleeves by employing adhesives or by wrapping the filament bundles around circumferential grooves on the sleeve periphery, cannot be relied upon to provide a connection of the requisite strength and durability.

It is, therefore, an object of the present invention to provide a novel, fiber reinforced resin shaft which minimizes or obviates problems of the types discussed above.

It is an additional object of the invention to provide a novel, fiber reinforced resin shaft suitable for use as a drive shaft in a vehicle power train.

It is a further object of the invention to provide novel methods and apparatus for securing metal connector sleeves to the ends of fiber reinforced resin shafts to enable the shafts to transmit high torsional loads.

BRIEF SUMMARY OF PREFERRED EMBODIMENTS OF THE INVENTION

These objects are achieved by the present invention wherein a metal sleeve having circumferentially spaced recesses upon the outer periphery thereof is positioned upon a segment of a mandrel. Fibrous material bearing a non-solidified resinous material is applied to the mandrel and over the recesses in the sleeve. Portions of the applied fibrous material are pressed into the recesses while bearing the non-solidified resinous material. Additional fibrous material bearing the non-solidified resinous material is applied to the previously applied resinous material. The resinous material is solidified with portions of the previously applied fibrous material positioned in the recesses to create a torsion-transmitting connection therebetween. Thereafter, the mandrel is removed.

THE DRAWING

Other objects and advantages of the present invention will become apparent from the subsequent detailed description of a preferred embodiment thereof in connection with the accompanying drawings in which like numerals designate like elements, and in which:

FIG. 1 is a side view of an end of a composite shaft formed in accordance with the present invention;

FIG. 2 is a cross-sectional view of the shaft, taken along line 2—2 in FIG. 1;

FIG. 3 is an enlarged, fragmentary view of the cross-sectional showing of FIG. 2;

FIG. 4 is a fragmentary, longitudinal sectional view of a connector sleeve in accordance with the present invention;

FIG. 5 is a cross-sectional view of the connector sleeve, taken along line 5—5 in FIG. 4;

FIG. 6 is an end view of a tongue-carrying segment forming part of the shaft of the present invention;

FIG. 7 is a longitudinal sectional view of a segment, taken along line 7—7 of FIG. 6;

FIG. 8 is a fragmentary, longitudinal sectional view of a shaft according to the present invention, taken along line 8—8 of FIG. 2;

FIG. 9 is a view similar to FIG. 8 taken along line 9—9 of FIG. 2;

FIG. 10 is a fragmentary longitudinal sectional view taken during an intermediate step of shaft fabrication depicting a segment being retained by a clamp;

FIGS. 11-15 are views corresponding to FIGS. 1, 2, 3, 8, and 9 of an alternate embodiment of the present invention.

DETAILED DESCRIPTION OF A PREFERRED EMBODIMENT OF THE INVENTION

A shaft 10 according to the present invention includes a fiber reinforced composite shaft body 12 of cylindrical cross-section, and a metal connector sleeve 14 secured preferably at each end of the shaft body.

The connector sleeve 14 is generally cylindrical and formed of an appropriate metal, such as steel or aluminum for example. The sleeve includes an inner annular surface 16 of constant diameter which is substantially contiguous with an inner surface 18 of the shaft body located longitudinally inwardly thereof, as is evident from FIG. 8.

The outer surface of the sleeve includes circumferentially spaced recesses. Preferably, there are provided longitudinally extending, circumferentially spaced grooves 20 (FIGS. 4, 5) which extend from an inner end 22 of the sleeve and terminate short of the outer end 24 thereof. If desired, the grooves 20 could extend the entire length of the sleeve. The depth of each groove increases as the longitudinally inner end 22 of the sleeve is approached. Radially outer edges 23 of the grooves form relatively sharp corners (FIG. 5).

The grooves 20 are defined by circumferentially spaced, radially projecting ribs 25 which increase in depth or thickness as the longitudinally inner end 22 of the sleeve is approached, thereby forming inclined faces 27 which face generally longitudinally and radially outwardly.

The inner end 22 of the sleeve 14 is tapered both longitudinally and radially inwardly at 26 to provide a feather edge 28 for the reception of windings of reinforced resin material as will be discussed.

During fabrication of a preferred form of the shaft, a pair of connector sleeves are positioned on a mandrel in longitudinally spaced relationship. The sleeves engage the mandrel somewhat snugly, but loosely enough to be removable therefrom. An appropriate clamping arrangement holds the sleeves in place. The mandrel is coated with a release substance to resist the adherence thereto of resin or adhesives. Thereafter, the shaft body 12 is formed around both the mandrel and sleeve.

Construction of the shaft body 12 is preferably performed in a manner more fully described in the aforementioned application of Yates and Rezin. Summarized briefly, layers of fiber reinforced resin-impregnated material are applied, prefably in the form of bundles of substantially parallel continuous filaments bearing a non-solidified (i.e., liquid, soft and tacky, or molten) resinous material. The bundles can be dipped in an uncured liquid thermosetting resin, such as an epoxy resin, and then wound around the mandrel in multiple passes until a layer of desired thickness is established. Attention is further directed to U.S. Pat. Nos. 3,661,670, 3,202,560, and 3,231,442 for additional details concerning possible arrangements for the clamping of sleeves and winding of filament bundles. The disclosures of these patents are incorporated herein by reference as if set forth at length.

The term "layer" as used herein specifies a circumferential zone within the wall of the tubular drive shaft wherein the fibrous reinforcement is disposed in a specific configuration and differs from the adjacent zone(s) with respect to the configuration and/or composition of the fibrous reinforcement. A single layer may include a multiple pass alignment or buildup of fibrous reinforcement in a given configuration. The term layer encompasses an alignment wherein the fibrous reinforcement is disposed therein at both plus and minus a given angle which optionally can be builtup in multiple passes.

The fibers reinforce the thermoset resin matrix to impart necessary properties of strength and durability to the shaft. In this regard, glass fibers (e.g., E-glass or S-glass) and carbon fibers (i.e., either amorphous or graphitic) materials are preferred. The carbon fibers commonly contain at least 90 percent carbon by weight, and preferably at least 95 percent carbon by weight. Additionally preferred carbon fibers have a Young's modulus of elasticity of at least 25 million psi (e.g., approximately 30 to 60 million psi).

The plies of filament bundles are wound in various orientation relative to the longitudinal axis of the drive shaft, and can be built-up to different thicknesses, respectively. Preferably, an initial layer of glass fibers is applied at an angle of from $\pm 30°$ to $\pm 50°$ relative to a line parallel to the longitudinal axis of the shaft. Next, a layer of glass fibers is applied at an angle of from 0° to $\pm 15°$. Thereafter, a layer of carbon fibers is applied at an angle of from 0° to $\pm 15°$. Then a layer of glass fibers is applied at about an angle of from about $\pm 60°$ to 90°.

Of course the number and composition of layers, as well as their orientation and thickness may vary, depending upon the characteristics desired to be imparted to the shaft.

Rather than utilizing filament winding (e.g., wet winding or prepreg winding), other tube forming procedures can be employed, such as tube rolling, tape wrapping, or pultrusion, for example. In the former step, comparatively wide sections of resin impregnated tape are precut to patterns, stacked in sequence, and rolled onto the mandrel.

After the layers have been applied, the non-solidified resin is cured. In this regard, the resin may be of a self-curing type, or may be of a kind which cures in response to being subjected to heat and/or a curing agent.

Relating more particularly to the present invention, after a pair of sleeves 14 have been properly positioned on a mandrel 15, an initial layer 30 of glass fibers is wound around the mandrel and sleeves at about a $\pm 45$ degree angle. This layer terminates short of the outermost end of the sleeve, so that the outer portion 24 of the sleeve remains exposed. The grooves 20 are circumferentially covered by this layer 30.

The filament bundles are preferably wound more loosely around the sleeve than around the mandrel to facilitate entry of the layer 30 into the grooves 20 as will be discussed.

A plurality of arc-shaped metal segments 32 (FIG. 6) are positioned around the circumference of the shaft. These segments, preferably formed of steel, include radially inwardly projecting, longitudinally extending tongues 34 which overlie the grooves 20. Wall portions 33 between the tongues are of diminishing thickness toward a longitudinally inner end of the segment to conform to the tapering ribs 25 of the sleeve 14. Sides 36 of the tongues extend at an angle relative to the radial direction so as to be convergent toward an imaginary point which lies between an inner face 38 of the tongue and the center of revolution of the segment 32.

The segments 32 are held in place on the sleeve in any suitable fashion, such as by one or more clamps 35 (FIG. 10) which extend circumferentially around the shaft and segments. In this fashion, the tongues 34 push portions of the layer 30 into the grooves 20 (FIG. 3).

Thereafter, a layer 39 of glass fibers is wound around the layer 30 and the segments 32 at about a zero degree angle. As this winding progressively covers the segments 34 (FIG. 10), the clamp or clamps 35 are removed. When the winding has been completed, the layer 39 will cover the segments to hold them firmly in position.

Next, a layer 40 of graphite fibers is wound around the layer 39 at about a zero degree angle.

Finally, a layer 42 of glass fibers is wound at about a 90 degree angle around the layer 40.

Thereafter, the non-solidified resin is cured to bond the layers together to form an integral composite, and the shaft is removed from the mandrel.

It will be understood that any number of layers can be applied and at various angles and thicknesses, depending upon desired shaft characteristics.

It will be appreciated that the above-described winding technique serves to mechanically lock shaft body 12 and sleeve 14 together. Longitudinal movement of the sleeve 14 in a longitudinally outward direction is prevented by engagement between the fiber layers and the inclined surfaces 27 of the ribs 25. Longitudinally inward movement of the sleeve 14 is prevented by engagement between the tapered surface 26 and the fiber layers. The sleeve and shaft body 12 are capable of transmitting high torque loadings therebetween. That is, the presence of portions of the layer 30 within the grooves 20 prevents relative rotation therebetween. The corners 23 of the grooves 20 which contact the layer 30 are relatively sharp, thereby effectively resisting the occurrence of relative slippage between the shaft body and sleeve. Dislodgement of the layer 30 from the grooves 20 is prevented by the metal segments 32, the latter being embedded within the fiber windings to form a permanent, integral part of the shaft.

The sleeves 14 facilitate connection of the shaft to metal components such as metal yokes in a vehicle power train, since direct metal-to-metal welding contact is possible.

Although not necessary, it might be desirable to apply an adhesive between the sleeve 14 and initial layer 30 to augment the connection therebetween.

In an alternative embodiment of the invention, depicted in FIGS. 11-15, the layers 30 and 39 are applied prior to emplacement of metal segments 50. These segments 50 include tongues 52 which constitute deformed portions of the segments. In this fashion, a recess 54 is formed on the outer surface of the segments. After the segments 50 are positioned around the layer 39, shims 56 are positioned in the recesses 54 so that the outer circumference defined by the segments is smooth and unbroken. The tongues 52 deform both layers 30, 39 inwardly such that portions of the layer 30 enter the grooves 20 and portions of the layer 39 enter resulting grooves formed in the layer 30. Thereafter, the layers 40 and 42 are applied.

Although the mechanical lock concept of the present invention is disclosed in conjunction with a particular shaft body, it is to be understood that this concept has utility with composite shafts in general wherein fibrous reinforcement is present in a resinous matrix material.

Although the invention has been described in connection with a preferred embodiment thereof, it will be appreciated by those skilled in the art that additions, modifications substitutions and deletions not specifically described may be made without departing from the spirit and scope of the invention as defined in the appended claims.

We claim:

1. A method of forming a tubular fiber reinforced composite shaft comprising the steps of:
   positioning a metal sleeve having circumferentially spaced recesses upon the outer periphery thereof upon a segment of a mandrel, said recesses each having a dimension in the longitudinal direction;
   applying fibrous material bearing a non-solidified resinous material upon said mandrel and over said recesses in said sleeve;
   arranging a plurality of pressing members in radially inwardly pressing relationship with said previously applied fibrous material and in overlying relationship with said recesses to press portions of said previously applied fibrous material into said recesses while bearing said non-solidified resinous material thereon;
   applying additional fibrous material bearing said non-solidified resinous material to said previously applied fibrous material and around said pressing members;
   solidifying said resinous material with the pressed portions of said previously applied fibrous material being positioned in said recesses to create a torsion-transmitting connection with said metal sleeve; and
   removing said mandrel.

2. A method according to claim 1, wherein said first-named applying step includes covering recesses in the form of longitudinally extending, circumferentially spaced grooves on the outer periphery of said sleeve.

3. A method according to claim 2, wherein said first-named applying step includes covering ribs disposed between said grooves, said ribs increasing in thickness in a direction away from the adjacent end of the shaft to present an inclined outer face.

4. A method according to claim 1, wherein said arranging step includes positioning a plurality of arc-shaped segments around said previously applied fibrous material, said pressing members comprising tongues extending radially inwardly from said segments.

5. A method according to claim 4, wherein said segments are arranged in circumferential end-to-end fashion to form a 360 degree cylinder.

6. A method according to claim 1, wherein said first-named applying step comprises applying a single layer of fibrous material prior to said pressing step.

7. A method according to claim 1, wherein said applying step includes applying a plurality of layers or fibrous material prior to said pressing step.

8. A method of forming a tubular reinforced composite drive shaft comprising the steps of:
   positioning a metal sleeve having longitudinally extending, circumferentially spaced grooves upon the outer periphery thereof upon a segment of a mandrel;
   applying fibrous material bearing a non-solidified resinous material upon said mandrel and over said grooves in said sleeve;
   arranging a plurality of pressing members in radially inwardly pressing relationship with said previously applied fibrous material and in overlying relation to said grooves to press portions of said fibrous material into said grooves while bearing said non-solidified resinous material thereon;

applying additional fibrous material bearing said non-solidified resinous material to said previously applied fibrous material and said tongues to retain said tongues in position;

solidifying said resinous material with portions of said previously applied fibrous material being positioned in said grooves to create a torsion-transmitting connection with said metal sleeve; and removing said mandrel.

9. A method according to claim 8, wherein said first-named applying step includes covering ribs disposed between said grooves, said ribs increasing in thickness in a direction away from the adjacent end of the shaft to present an inclined outer face.

10. A method according to claim 8, wherein said arranging step comprises positioning a plurality of arc-shaped segments in circumferential end-to-end fashion to form a 360 degree cylinder, said pressing members comprising tongues extending from said segments.

11. A method according to claim 8, wherein said first-named applying step comprises applying a single layer of fibrous material prior to said pressing step.

12. A method according to claim 8, wherein said first-named applying step comprises a plurality of layers of fibrous material prior to said pressing step.

* * * * *